United States Patent Office.

MAX SCHROEDER, OF HAMBORN, GERMANY, ASSIGNOR OF TWO-THIRDS TO THE ACTIEN-GESELLSCHAFT FÜR ZINK-INDUSTRIE, VORMALS WILHELM GRILLO, OF OBERHAUSEN, GERMANY, AND AUGUST HECKSCHER, OF NEW YORK, N. Y.

CATALYTIC MATERIAL.

SPECIFICATION forming part of Letters Patent No. 636,925, dated November 14, 1899.

Original application filed October 19, 1898, Serial No. 694,019. Divided and this application filed September 22, 1899. Serial No. 731,338. (No specimens.)

*To all whom it may concern:*

Be it known that I, MAX SCHROEDER, a German subject, residing at Hamborn, Rheinland, Germany, have invented certain new and useful Improvements in Catalytic Materials; and I do hereby declare the following to be a full, clear, and exact description of the invention, such as will enable others skilled in the art to which it appertains to make and use the same.

In an application for Letters Patent of the United States filed by me October 19, 1898, Serial No. 694,019, of which the present application is a division, I have described and claimed the production and utilization of a contact mass for catalytic processes, wherein the catalytic agent is present in a fine state of subdivision within a carrier or vehicle of soluble salts, so that when it is desired to regenerate the material or recover the catalytic agent therefrom for further use that purpose may be effected by dissolving out the soluble salts from the contact body. The present application is intended to claim the product— *i. e.*, the contact body itself.

In the art of recovering sulphuric acid or sulphuric anhydride ($SO_3$) by the catalytic or contact method platinum has shown itself as an especially-effective substance above all others for producing the desired result.

Inasmuch as platinum, even in finely-divided condition, is of too small volume to act effectively throughout in a large current of gases containing sulphurous anhydride ($SO_2$) and oxygen, resort was soon had to the expedient of superimposing the metal upon an inert or comparatively inert base, so as to spread the metal out over a large surface. Pumice-stone was at first proposed for this purpose and appeared especially applicable thereto on account of its numerous cavities. Winkler developed the subject further and ascertained that almost all loosely-porous bodies are adapted to serve for the contact substance proper, especially asbestos, and also mineral wool, infusorial earth, clay, and (where, as in certain contact processes, a high temperature is not required) even organic fibrous materials. In German Patent No. 4,566 Winkler describes a special process for the chemical application of platinum upon these bases, which process he likens to the final step in the dyeing of a fiber in the dye-vat. Moreover, from later publications it appears that for the production of these platinized contact bodies there has always been employed a base either molded to shape or otherwise in integral or solid condition.

The present invention contemplates the subdivision or dilution of the platinum in a different manner and by other means, whereby in a very simple way contact masses of extraordinary subdivision may be obtained which far exceed in efficiency those heretofore employed.

Instead of the solid or integral bases hereinbefore referred to employment is made of the soluble salts of the alkalies, of the alkaline earths, of the earths, and of the metals, which salts for the production of the contact mass are to be dissolved in water and then mixed with a solution of the finely-divided platinum salt. The mixture of the solutions is then to be evaporated and the resulting salt crusts dried and broken up to about a uniform granular size. The powder which is formed during this reducing or breaking-up operation is to be dissolved anew in water and treated as before until all of the material has been converted into an appropriate condition of grains or particles. This material is adapted directly for filling the cylinders or other apparatus employed in carrying out the contact process. The separation of the metallic platinum in the finest subdivision between the molecules of the salts serving as vehicles for the platinum takes place of itself upon heating—*i. e.*, upon the starting of the contact process.

It will be apparent that the salts serving as vehicles for the finely-divided platinum will only remain unchanged during the contact process, provided they are either stable sulphates or provided they contain an acid which—as, for instance, phosphoric acid—is stronger at a low red heat than the sulphuric acid which forms during the process. Other salts—as, for instance, chlorides or carbonates—will at the beginning of the process be at once converted into sulphates with development of their acids. Inasmuch as this results for the most part in an alteration of the structure and injury to the firm cohesion of the individual pieces, it is advisable to employ stable salts from the beginning.

As an example of particular proportions for obtaining a contact mass involving my invention, but without in any way intending to limit myself thereto, I may state that in some instances the contact mass may be produced by dissolving in the smallest quantity of water one hundred pounds of sulphate of potassium, one hundred pounds of sulphate of magnesium, and one hundred pounds of sulphate of aluminium and adding to the solution ten pounds of chloride of platinum likewise dissolved in water, whereupon the mixture is evaporated, dried, and granulated, as described.

It will be understood that instead of the single salts mixtures thereof, or double salts—as, for instance, alum—can be employed. Furthermore, instead of platinum other metals of the platinum group may be used which, however, in view of their great rarity, come less into consideration in practice.

The technological advantages of this new contact material consist not only in the simple manner of producing it, but also in its highly superior efficiency. The platinum is in a condition of extraordinarily-fine subdivision and appears to be effective in the interior of the pieces to a degree not less than in the exterior layers. This may be due to the great porosity produced by the driving off of the water of crystallization.

The solubility of the salts within which the catalytic agent is occluded in contact bodies made in accordance with my invention is particularly of value when the ordinary furnace-gases from sulphur ores are employed for the contact process. Inasmuch as the furnace-gases, even after purifying, still contain traces of dust, the contact bodies in the course of time become covered with thick impenetrable layers, which diminish their efficiency. To lay bare the surface, it is only then necessary to stir the contact body in water and to evaporate the salt solution thus formed. The dust is thereby dispersed throughout the entire mass and can no longer diminish the penetrability of the surface. Finally the dust may be readily separated from the platinum after dissolving out the salts which serve as the vehicle. For this purpose it is only necessary to boil with concentrated muriatic acid the slime which has been separated from the salt solution, whereupon the particles of dust pass into solution, while the platinum-black remains behind in a pure condition.

It is of course obvious that inert material (such as infusorial earth, sand, and the like) may be present in the contact body, provided it is not present in such proportion as to interfere with the action of the soluble salts in holding the particles together, and thereby serving as carriers or vehicles for the catalytic agent.

Having thus described the invention, what I claim is—

1. A contact body for use in catalytic processes, comprising salt crusts, containing a platinum salt distributed through a mass of one or more other soluble salts which serve as a carrier or vehicle therefor; substantially as described.

2. A contact body for use in catalytic processes, comprising a catalytic substance distributed through a mass of one or more soluble salts serving as a carrier or vehicle therefor; substantially as described.

3. A contact body for use in catalytic processes, comprising a catalytic substance distributed through a mass of one or more soluble salts stable in the presence of hot $SO_2$ and O and serving as a carrier or vehicle for the catalytic substance; substantially as described.

In testimony whereof I affix my signature in presence of two witnesses.

MAX SCHROEDER.

Witnesses:
 WALDEMER HAUPT,
 WILLIAM MAYNER.